(12) United States Patent
Johnson (10) Patent No.: US 6,233,085 B1
(45) Date of Patent: May 15, 2001

(54) APPARATUS, METHOD, AND COMPUTER PROGRAM PRODUCT FOR CONTROLLING AN INTERFERROMIC PHASED ARRAY

(75) Inventor: Bartley C. Johnson, Clayton, MO (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/420,391

(22) Filed: Oct. 19, 1999

(51) Int. Cl.$^7$ .................................................. G02F 1/01
(52) U.S. Cl. .................. 359/279; 359/245; 359/340; 356/5.09; 372/6
(58) Field of Search .................. 359/279, 245, 359/340, 341; 372/6; 356/5.09

(56) References Cited

U.S. PATENT DOCUMENTS

| | | | |
|---|---|---|---|
| 3,752,992 | * 8/1973 | Fluhr | 250/199 |
| 4,814,774 | 3/1989 | Herczfeld | 342/372 |
| 5,164,733 | 11/1992 | Nettleton et al. | 342/54 |
| 5,233,673 | 8/1993 | Vali et al. | 385/3 |
| 5,500,729 | 3/1996 | Redman et al. | 356/5.09 |
| 5,621,514 | 4/1997 | Paranto et al. | 356/5.09 |
| 5,694,408 | 12/1997 | Bott et al. | 372/6 |
| 5,724,169 | * 3/1998 | LaGasse | 359/173 |
| 5,790,722 | 8/1998 | Minden et al. | 385/27 |
| 5,832,006 | 11/1998 | Rice et al. | 372/3 |
| 5,847,816 | 12/1998 | Zediker et al. | 356/5.09 |
| 5,877,851 | 3/1999 | Stann et al. | 356/5.09 |
| 5,887,009 | 3/1999 | Mandella et al. | 372/6 |

* cited by examiner

Primary Examiner—Georgia Epps
Assistant Examiner—Tim Thompson
(74) Attorney, Agent, or Firm—Alston & Bird LLP (57) ABSTRACT

The present invention provides several apparatus, methods, and computer program products for phase shifts in an optical signal generated by an optical device. The present invention includes a optical phase modulator for altering the phase of the optical signals output by an optical device. The present invention also includes a detector assembly that receives an interference signal generated by an optical interference of a power signal and a reference signal. The detector assembly generates a lockin signal representing the optical phase difference between the power signal and the reference signal. Connected to both the detector assembly and the optical phase detector is a processor. The processor receives the lockin signal from the detector assembly and compares the lockin signal to at least one predetermined set point value. The predetermined set point value represents either a desired maximum lockin signal value or a range of acceptable lockin values. If the lockin signal either exceeds the set point value or is not within a range of lockin signal values defined by the predetermined set point value, the processor combines the lockin signal with a step waveform and generates a combined feedback signal having a value within desired operation parameters of the optical phase modulator. In one embodiment of the invention, the processor combines the lockin signal with an exponential step function having a step portion of $2\pi n$.

42 Claims, 7 Drawing Sheets

FIG. 1.

$\Delta\Phi_{env} = \Delta\Phi_{tot} + G\sin(\Delta\Phi_{tot})$

APPARATUS, METHOD, AND COMPUTER PROGRAM PRODUCT FOR CONTROLLING AN INTERFERROMIC PHASED ARRAY

FIELD OF THE INVENTION

The present invention relates generally to laser systems and more particularly to control systems for controlling the phase of optical signals output by laser systems.

BACKGROUND OF THE INVENTION

Lasers are presently employed for a wide variety of applications. For example, lasers are employed to process materials, such as by cutting, welding, heat treating, drilling, trimming and coating materials, stripping paint, removing coatings, cleaning surfaces, and providing laser markings. Lasers are also used in many medical applications for precision surgery. Additionally, lasers are used in military applications, including laser weapon and laser ranging systems. Laser communication systems have also been developed in which laser signals are transmitted in a predetermined format to transmit data.

Along with the ever increasing number of applications in which lasers are used, the demands on the laser systems are also ever increasing. For example, a number of applications, including military, materials processing, medical, and communications applications, demand continuous wave lasers which emit increasingly higher power levels. In addition, a number of applications demand that the laser system produce an output beam which is of high quality, e.g., exhibiting predominantly or entirely fundamental or $TEM_{00}$ mode characteristics. Accordingly, the output beam can be more definitely focused to achieve higher brightness. At the same time, many applications require that the laser system produce an output beam which is adaptable or dynamically controllable.

One example of the need for high power, high quality laser beams is illustrated in laser devices used for focusing on remote targets. In these applications, it advantageous for the laser beam to achieve a maximum brightness at the location of the target. For example, in military applications, it is advantageous to generate a laser beam that is focused on the remote target with maximum intensity. Similarly, in medical applications, it is essential that the laser beam is focused at the target tissue such that surrounding tissue is not affected. However, an overall problem with the control of laser beams is perturbations in the atmosphere in which the laser beam propagates. These perturbations degrade the laser beam, deflect the laser beam, and reduce laser power.

To address the problems associated with these perturbations and provide control of the laser beams, devices have been developed that sense the perturbations occurring in the path of the laser beam and compensate for these perturbations by adjusting the laser beam. For example, The Boeing Company, assignee of the present application, has developed several different types of laser devices that generate high powered, turbulence compensated laser beams. Examples of these device are discussed in detail in U.S. Pat. No. 5,694, 408 to Bott et al., U.S. Pat. No. 5,847,816 to Zediker et al., and U.S. Pat. No. 5,832,006 to Rice et al., the contents of which are incorporated herein by reference.

The basic approach to many of these devices is to amplify a coherent signal emitted from a master oscillator using a phased array of fiber optic amplifiers. A portion of the output optical signal referred to as a power signal is extracted for comparison to a reference laser beam also output by the master oscillator. The power signal and the reference signal are combined by interference, and the interference signal is sampled by an array of detectors. The difference in phase between the power and reference signal is recorded by the detector, and is used as feedback for altering the phase modulation of the power signal via an array of phase modulators that are in optical communication with respective fiber optic amplifiers.

As an example, in one application, a reference beam is initially transmitted to a target of interest, and the reflection of the beam indicates atmospheric turbulence in the path of the output laser beam. To counteract these turbulence, the device alters the phase of signals emitted by the various fiber optic amplifiers such that the output laser has a wavefront that compensates for the atmospheric turbulence. An important component of this device is the feedback loop used to control the phase modulation of the output laser beam. Specifically, as discussed, a portion of the output laser beam is combined through interference with a reference signal to determine the phase difference for the signals emitted by each fiber optic amplifier. By use of the feedback signal representative of the phase of the output laser beam and knowledge of the desired wavefront, the output laser beam can be controlled via the array of phase modulators to produce the desired wavefront and/or to appropriately steer or tilt the wavefront.

An important aspect of these laser devices is the control of the phase of the output laser beam by the array of phase modulators. As discussed, these phase modulators are controlled by a feedback signal representing the difference in phase of a portion of the output laser beam called the power signal and the reference signal. Although these systems, for the most part, provide reliable and accurate control of the output laser beam, problems may be encountered when the feedback signal exceeds a desired maximum feedback value such that saturation may occur. An additional problem is experienced when the feedback signal causes uncontrolled modulation changes in the output signal.

Figure 1:
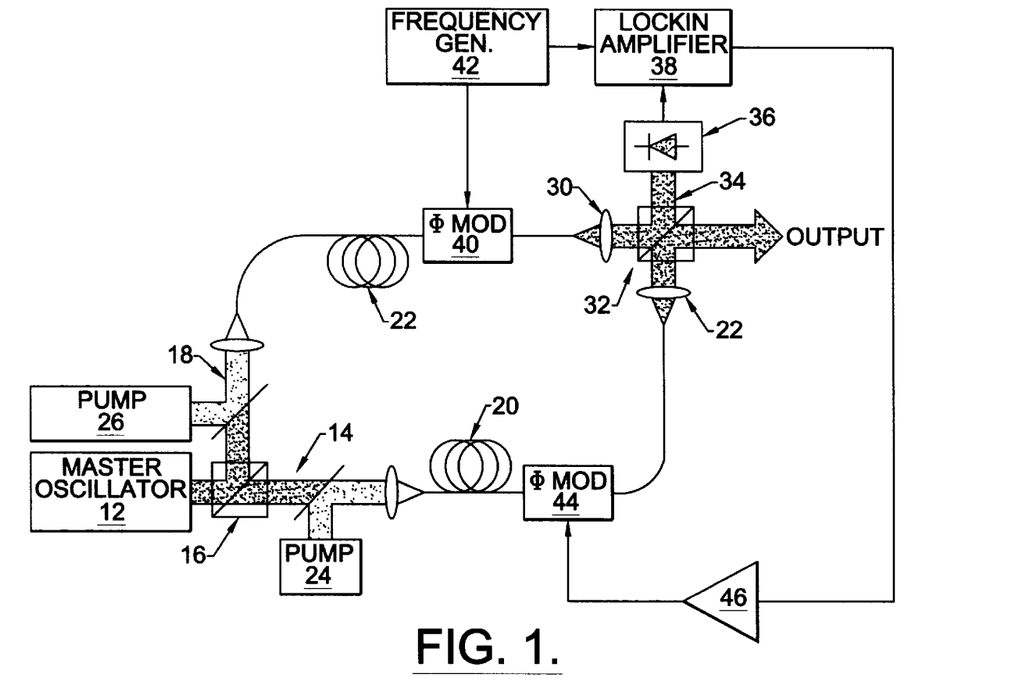
FIG. 1 is a block diagram of an optical interferometer in which the apparatus of the present invention may be implemented.

The problems associated with the phase modulators are illustrated with reference to FIG. 1. FIG. 1 is a block diagram representation of a typical Mach-Zehnder interferometer that uses a feedback signal to correct for phase differences. Specifically, the laser device 10 includes master oscillator 12 that produces an output optical signal 14. This output optical signal is directed to a beam splitter 16 that creates a power and a reference signal 18. The reference and power signals are amplified by respective fiber amplifiers 20 and 22 and pump sources 24 and 26. The reference and power signals are collimated by collimating lenses 28 and 30. A portion of the power signal is separated by a beam splitter 32, and the reference signal and the power signal are combined by interference to produce an interference signal 34. The interference signal is detected by a detector 36 and supplied to a lockin amplifier 38.

Prior to interference with the output signal, the reference signal is modulated with a reference phase modulator 40 at a predetermined frequency provided by a frequency generator 42. The predetermined frequency is also supplied to the lockin amplifier 38, which generates a lockin signal that is proportional to the sine of the phase difference between the reference and power signals at the predetermined frequency. This lockin signal is provided to an optical phase modulator 44, which alters the phase of the power signal to substantially match the phase of the reference signal. As such, the phase of the output signal may be regulated. The feedback loop may also include a gain amplifier 46 that amplifies the lockin signal prior to input into the phase modulator.

Figure 2:
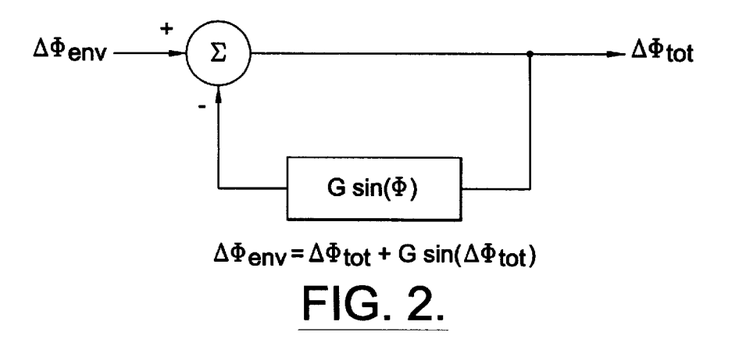
FIG. 2 is a block diagram of the feedback control loop for the optical interferometer of FIG. 1.

As discussed above, problems may be encountered where the lockin signal either exceeds the maximum input of the phase modulator or the lockin signal is such that it may introduce uncontrollable phase changes in the output signal. This problem is more specifically illustrated with reference to FIGS. 2 and 3. FIG. 2 illustrates in block diagram form the feedback loop of the laser device of FIG. 1. Specifically, the interference signal received by the detector represents phase difference $\Delta\phi_{tot}$ between the reference and output signals and consists of gain differences and environmental phase differences $\Delta\phi_{Env}$. The interference signal 34, shown in FIG. 1, is provided to the lockin amplifier, which, in turn, generates a lockin signal that is proportional to the sine of the phase difference between the reference and output signals (i.e., $\sin(\Delta\phi_{tot})$). The lockin signal is also gain amplified by the gain amplifier 46 (i.e., $g\sin(\Delta\phi_{tot})$), prior to being presented to the phase modulator, which alters, i.e., reduces, the phase of the signal by a corresponding amount. As such, the relationship between $\Delta\phi_{tot}$ and $\Delta\phi_{Env}$ is expressed as follows:

$$\Delta\phi_{tot} = \Delta\phi_{Env} - g\sin(\Delta\phi_{tot})$$

Figure 3:
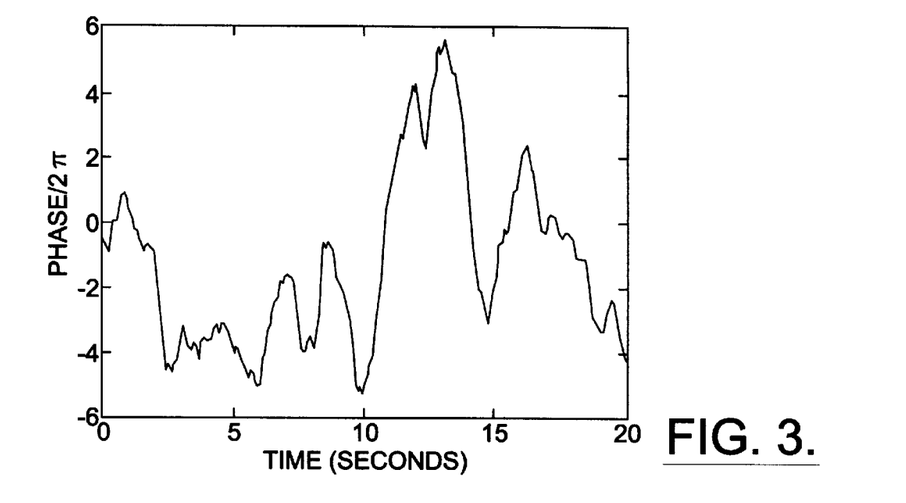
FIG. 3 is a graphic representation of the difference in phase between the reference and output signals of the optical interferometer of FIG. 1 over a period of time.

As illustrated by the equation, a shift in environmental phase between the reference and power signal will directly affect the value of the feedback signal. With reference to FIG. 3, the drift in phase between the reference and output signals of a typical optic interferometer is illustrated. As can be seen, the interferometer may experience large phase drifts due to environmental causes over a short period of time. These large phase drifts may cause problems with operation of the phase modulators. Specifically, typical phase modulators have maximum input limits, above which, the phase modulators will saturate. In systems such as described above, if the environmental changes generate a signal that is greater than a desired maximum lockin signal, saturation may occur, which will affect operation of the laser device.

Figure 4:
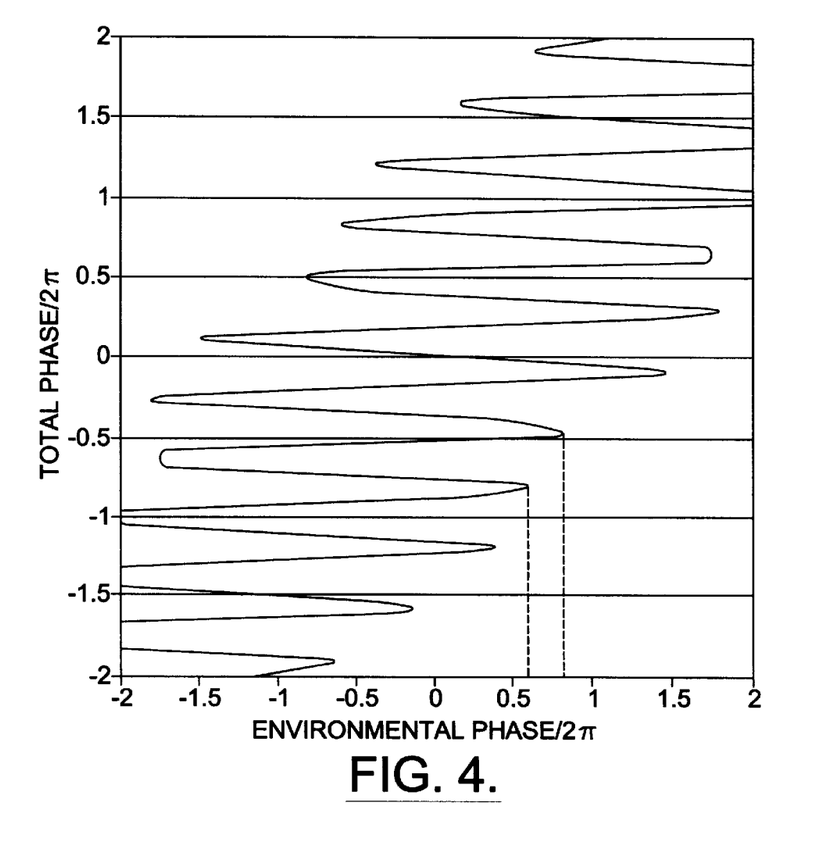
FIG. 4 is a graphic representation of the feedback signal illustrated in FIG. 2.

An additional concern with the feedback signal is related to sinusoidal aspects of the feedback signal. With reference to FIG. 4, the feedback signal for a particular gain value of g=10 is plotted in terms of $\Delta\phi_{tot}$ vs. $\Delta\phi_{Env}$. As can be seen from this graphic representation, for certain environmental phase difference values, the change in total phase may be such that modulation of the power signal is uncontrollable. For example, if the environmental phase difference is currently $\Delta\phi_{Env}/2\pi \approx 0.56$, then the total phase difference is $\Delta\phi_{tot}/2\pi \approx -0.8$. However, if in the next instant, the environmental phase changes to $\Delta\phi_{Env}/2\pi \approx 0.77$, the total phase difference will change to $\Delta\phi_{tot}/2\pi \approx -0.5$. This change in phase may cause uncontrollable phase changes in the output signal.

SUMMARY OF THE INVENTION

As set forth below, the present invention provides several apparatus, methods, and computer program products that may overcome many of deficiencies detailed above concerning the phase control of laser devices. The present invention provides various apparatus, methods, and computer program products that analyze the lockin signal in a feedback loop of an optical interferometer prior to application of the lockin signal to the optical phase modulator. Specifically, the present invention compares the lockin signal to at least one set point value, and if the lockin signal exceeds the set point value, the present invention combines the lockin signal with a step waveform to produce a combined feedback signal that has a value within desired operation parameters of the optical phase modulator. By initially analyzing the lockin signal prior to input into the optical phase modulator, the present invention can prevent saturation of the laser system and also alleviate uncontrollable changes in the modulation of the power signal.

For example, in one embodiment of the present invention, the predetermined set point value represents a desired maximum lockin signal value above which saturation may occur. In this embodiment, the present invention analyzes the lockin prior to application to the optical phase modulator to determine whether the lockin exceeds the predetermined set point value. If the lockin signal exceeds the predetermined set point value, the present invention alters the lockin signal prior to application to the optical phase modulator, such that saturation does not occur.

In another embodiment of the present invention, the predetermined set point is actually two predetermined set point values that define a range of lockin values that are within desired operation parameters of the optical phase modulator. Specifically, in this embodiment of the present invention, lockin values that are not within the range of the two set point values may cause uncontrollable changes in modulation of the output signal. In this embodiment, the present invention analyzes the lockin signal prior to its application to the optical phase modulator to determine whether the lockin signal is outside the range of the two set point values. If the lockin signal is outside the range of the set point values, the present invention alters the lockin signal prior to application to the optical phase modulator, such that there are not uncontrollable phase changes in the output signal of the laser system. Additionally, the present invention may be implemented to control the phase modulation of a single output signal or it may be implemented in a system to control a plurality of output signals.

These and other advantages are provided, according to the present invention, by an apparatus for compensating for phase shifts in an optical signal generated by an optical device. The apparatus of this embodiment includes an optical phase modulator for altering the phase of the optical signal. Additionally, the apparatus of this embodiment includes a detector assembly for receiving an interference signal generated by optical interference of a power signal and a reference signal and generating a lockin signal representative of a phase difference between the power and reference signals. Optically connected to both the optical phase modulator and the detector assembly is a processor for analyzing the lockin signal.

In operation, the detector initially receives an interference signal representing the interference of a reference and power signal. The detector assembly generates a lockin signal representing the phase difference between the reference and power signals. The processor receives the lockin signal and compares the lockin signal to at least one predetermined set point value. If the lockin signal exceeds the set point value, the processor combines the lockin signal with a step waveform to generate a combined feedback signal having a value within desired operation parameters of the optical phase modulator.

As discussed above, the apparatus of the present invention compares the lockin signal to the predetermined set point value. In one embodiment of the present invention, the set point value defines a desired maximum lockin value above which saturation may occur. In this embodiment of the present invention, the processor compares the lockin signal to the predetermined set point value, and if the lockin signal exceeds the set point value, the processor combines the lockin signal with a step waveform to generate a combined feedback signal having a value within desired operation parameters of the optical phase modulator.

In another embodiment of the present invention, the predetermined set point value is two predetermined set point values defining a range of feedback values that are within desired operation parameters of the optical phase modulator. Specifically, in this embodiment, feedback signals having values outside the range of the set point values may cause uncontrollable modulation changes. As such, in this embodiment, if the value of the lockin signal is outside the range of lockin values between the set point values, the processor combines the lockin signal with a step waveform to generate a combined feedback signal having a value within desired operation parameters of the optical phase modulator.

In some embodiments of the present invention, the detector assembly generates a feedback signal representing the sine of the phase difference between the reference and optical signals. In this embodiment of the present invention, the feedback signal may have a value that is a multiple of $2\pi$ plus some value, i.e., $2\pi n + x$. For example, the feedback signal may have a value such as 0, $2\pi$, $2.1\pi$, $3.3\pi$, $4.3\pi$, etc. Since $\sin(x)$ and $\sin(2\pi n + x)$ is the same, the processor may combine the lockin signal with a step waveform having an initial step that is $2\pi n$, where n is an integer, to create a combined feedback signal that is within the operating parameters of the optical phase modulator. Because the lockin signal has been altered by $2\pi n$, the optical phase modulator will alter the phase of the power signal correctly.

As discussed above, the processor of the present invention combines the lockin signal with a step waveform if the feedback signal exceeds the predetermined set point value. The alteration of the lockin signal may be achieved using several different waveforms. For example, the processor combines a step exponential function with the lockin signal to generate a combined feedback signal having an amplitude that is altered by a factor of $2\pi n$, where n is an integer.

As discussed above, the apparatus of the present invention includes a detector assembly for detecting the interference signal and generating a feedback signal representing the phase difference between the reference and output signals. In one embodiment of the present invention, the detector assembly includes a detector for detecting the interference signal and a lockin amplifier for generating the feedback signal. In this embodiment of the present invention, the apparatus also includes a reference phase modulator optically upstream from the detector and a frequency generator connected to both the reference phase modulator and the lockin amplifier.

In this embodiment of the present invention, the frequency generator supplies a reference frequency to both the lockin amplifier and the reference phase modulator. The reference phase modulator is connected to the reference signal and dithers the reference signal at the reference frequency supplied by the frequency generator prior to the reference signal interfering with the power signal. The detector detects the interference signal created by the interference of the reference and power signals. The lockin amplifier receives the interference signal and generates a lockin signal representing the sine of an optical phase difference between the power signal and the reference signal. Finally, the processor analyzes the lockin signal to determine whether the lockin signal should be altered prior to introduction to the optical phase modulator.

In addition to providing apparatus and methods for analyzing the lockin signal such that the lockin signal does not exceed predetermined set points, the present invention also provides computer program products. The computer program products of the present invention are similar to the apparatus and methods of the present invention in that they compensate for phase shifts in an optical signal generated by an optical device having an optical phase modulator that alters the phase of the optical signal and a detector assembly that generates a lockin signal representing an optical phase difference between a power signal and a reference signal.

The computer program products of the present invention include a computer readable storage medium having computer readable program code means embodied in the medium. The computer-readable program code means includes first computer-readable program code means for comparing the lockin signal to at least one predetermined set point value, and second computer-readable program code means for combining the lockin signal with a step waveform to create a combined feedback signal, if the lockin signal exceeds the set point value, such that the combined feedback signal has a value within desired operation parameters of the optical phase modulator. As such, the computer program product of the present invention can also prevent saturation and alleviate uncontrollable phase changes in the modulation of the output signal.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As discussed above, the present invention provides various apparatus, methods, and computer program products for compensating for phase shifts in an optical signal generated by an optical device. Specifically, the present invention provides various apparatus, methods, and computer program products that analyze the lockin signal of an optical interferometer prior to application of the lockin signal to an optical phase modulator. The present invention compares the lockin signal to at least one set point value, and if the lockin signal exceeds the set point value, the present invention combines the lockin signal with a step waveform to generate a combined feedback signal having a value within desired operation parameters of the optical phase modulator. By initially analyzing the lockin signal prior to input into the optical phase modulator, the present invention can prevent saturation and also alleviate uncontrollable changes in the modulation of the output signal.

With relation to the description of the various embodiments of the present invention provided in detail below, it must be understood that the present invention can be used with laser systems that use feedback loops to control the phase of an optical signal output by the laser system. However, the various apparatus, methods, and computer program products of the present invention have been illustrated below with reference to two specific laser systems for illustrative purposes. As this disclosure is for illustrative purposes only, the scope of the present invention should not limit the use of the present invention with other systems, as the concepts and designs described below may be implemented in any laser system that uses a feedback loop to control the phase of an optical signal output by the laser system.

Figure 5:
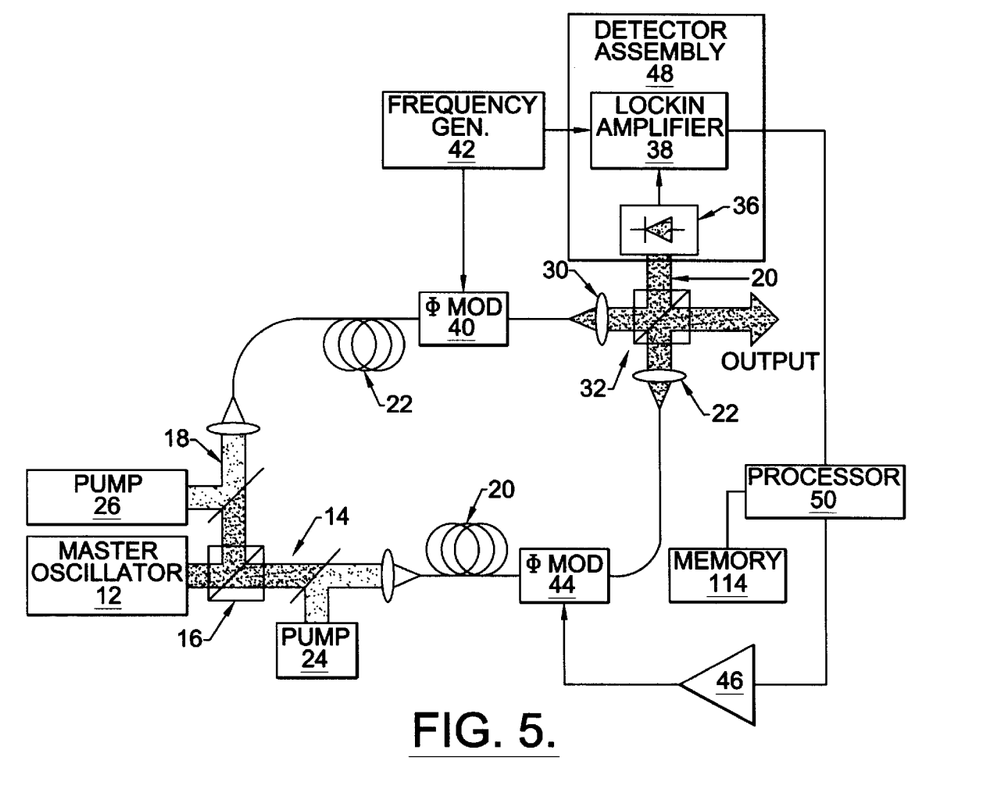
FIG. 5 is a block diagram of an apparatus for controlling the phase of an output signal in a laser system according to one embodiment of the present invention.

With reference to FIG. 5, an apparatus for compensating for phase shifts in an optical signal generated by an optical device according to one embodiment of the present invention is illustrated in conjunction with a Mach-Zehnder interferometer as illustrated in FIG. 1. As previously detailed in FIG. 1, the interferometer 10 includes a master oscillator 12 for producing an output optical signal 14. Optically connected to the master oscillator is a beam splitter 16 for separating the output signal into a reference signal and a power signal. Optically connected to the outputs of the beam splitter are respective fiber amplifiers 20 and 22 and pump sources 24 and 26, which amplify the power and reference signals. Downstream from the fiber amplifiers are collimating lenses 28 and 30 and a beam splitter 32 for collimating the power and reference signals and combining the reference and power signals by interference. Upstream from the collimating lens 28 that collimates the reference signal, the interferometer includes a reference phase modulator 40 in optical communication with the reference signal and a frequency generator 42 for dithering the reference signal at a predetermined frequency.

One embodiment of the apparatus of the present invention also includes an optical phase modulator 46 in optical communication with the output signal for controlling the phase of the optical signal. The apparatus of the present invention further includes a detector assembly 48 for receiving the interference signal generated by the optical interference of the power signal and the reference signal and generating a lockin signal. Connected to both the detector assembly and the optical phase modulator is a processor 50 for analyzing the lockin signal prior to application of the lockin signal to the optical phase modulator.

In operation, the master oscillator initially generates an output signal and the beam splitter splits the optical signal into a power and a reference signal. The reference and power signals are typically amplified by respective fiber amplifiers and pump sources. The reference signal is next dithered by the reference phase modulator at a frequency set by the frequency generator. The dithered reference signal and the power signal are next collimated by the collimating lenses. The reference signal and power signals are then combined by interference to produce an interference signal.

Figure 6:
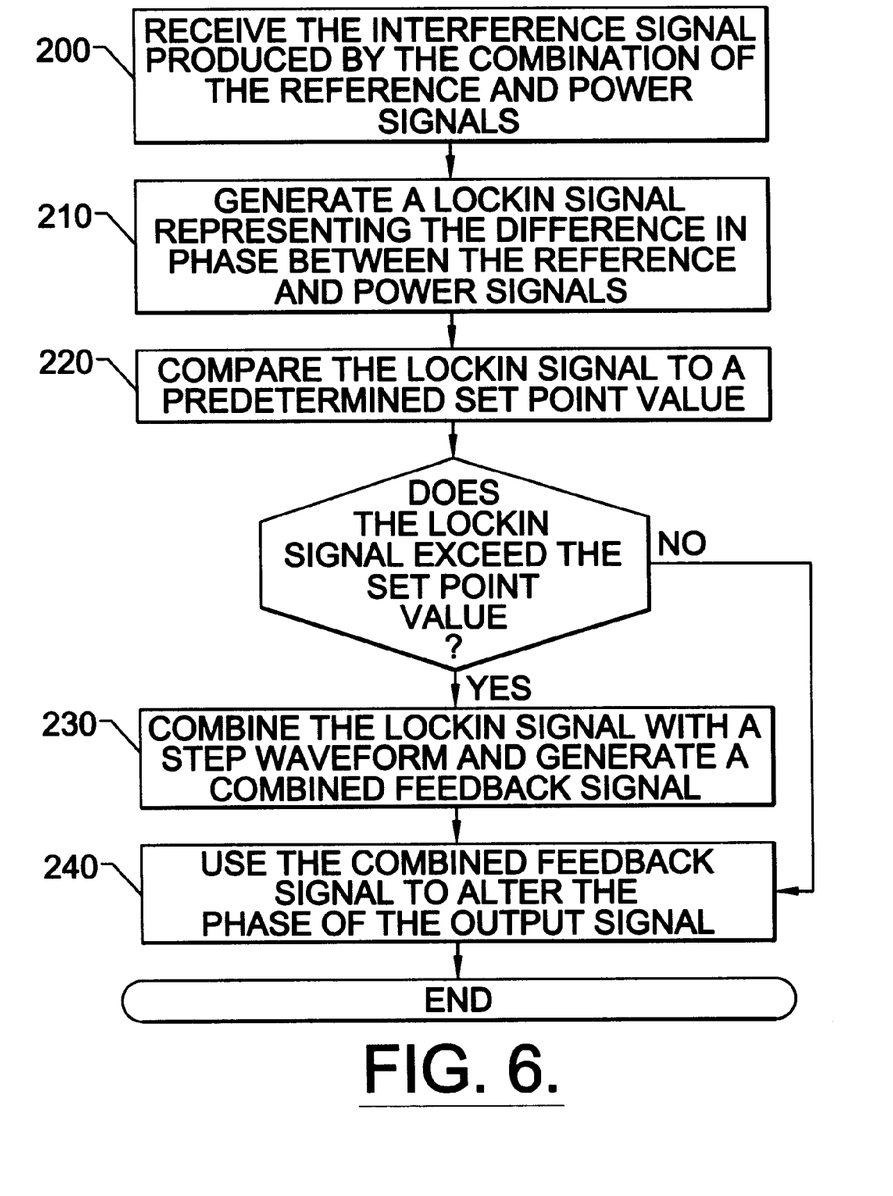
FIG. 6 is a block diagram of the operations performed to control the phase of an output signal in a laser system according to one embodiment of the present invention.

With reference to FIG. 6, the operation of the apparatus of the present invention to control the phase modulation of the laser system is shown. In this embodiment of the present invention, the detector assembly receives the interference signal produced by the combination of the reference and power signals. (See step 200). The detector assembly generates a lockin signal representing the difference in phase between the reference and output signals. (See step 210). The processor receives the lockin signal and compares the lockin signal to a predetermined set point value. (See step 220). If the lockin signal exceeds the predetermined set point value, the processor combines the lockin signal with a step waveform to generate a combined feedback having a value within desired operation parameters of the optical phase modulator. (See step 230). If the lockin signal does not exceed the predetermined set point value, the lockin signal is not altered. The feedback signal or the lockin signal, if it is not altered, is next provided to the optical phase modulator, where the feedback signal or unaltered lockin signal is used to alter the phase of the output signal. (See step 240).

As discussed above, the present invention includes a detector assembly for receiving an interference signal and generating a feedback signal representative of the interference signal. With reference to FIG. 5, in one embodiment of the present invention, the detector assembly 48 includes a detector 52 and a lockin amplifier 54. In this embodiment of the present invention, the detector receives the interference signal generated by the interference of the reference and power signals. The lockin amplifier, in turn, generates a lockin signal that is proportional to the sine of the phase difference between the reference and power signals. The lockin amplifier of this embodiment is a commercially available device manufactured by Stanford Research Systems located in Sunnyvale, Calif.

As discussed, the present invention provides apparatus, methods, and computer program products that analyze the lockin signal prior to application to the optical phase modulator such that the lockin signal is within the operating parameters of the optical phase modulator. Importantly, the present invention alters the lockin signal such that the lockin signal is at an appropriate value for application to the optical phase modulator. For instance, in one embodiment of the present invention, there may be a maximum desired input value from the feedback value, above which saturation may occur. In this embodiment of the present invention, the predetermined set point value may represent a maximum desired feedback value.

With reference to FIG. 6, in this embodiment, the processor receives the lockin signal and compares the lockin signal to the predetermined set point value. (See step 220). If the lockin signal exceeds the predetermined set point value, the processor combines the lockin signal with a step waveform and generates a combined feedback signal having a value within desired operation parameters of the optical phase modulator. (See step 230). The combined feedback signal or lockin signal, if not altered, is next provided to the optical phase modulator, where the feedback or lockin signal is used to alter the phase of the output signal, with reduced risk of saturation. (See step 240).

As discussed earlier with reference to FIG. 4, in embodiments in which a lockin amplifier is used, the lockin amplifier generates a lockin signal that represents the sine of the phase difference between the reference and power signals. As shown in FIG. 4, in this embodiment, due to the sinusoidal nature of the lockin signal generated by the lockin amplifier (i.e., $g\sin(\Delta\phi_{tot})$), some values of the lockin signal may cause uncontrollable modulation of the output signal. For this reason, in one embodiment of the present invention, the predetermined set point value may represent a range of lockin values, where lockin values outside this range may cause the optical phase modulator to experience uncontrollable modulation.

With reference to FIG. 6, in this embodiment of the present invention, the lockin amplifier of the detector assembly generates a lockin signal and the processor receives the lockin signal. The processor compares the lockin signal to the predetermined set point values. (See step 220). If the lockin signal is not within the range of lockin signals defined by the predetermined set point values, the processor combines the lockin signal with a step waveform and generates a combined feedback signal having a value within desired operation parameters of the optical phase modulator. (See step 230). The feedback signal or the lockin signal, if not altered, is next provided to the optical phase modulator, where the feedback of lockin signal is used to alter the phase of the output signal, with reduced risk of uncontrolled modulation. (See step 240).

Figure 7:
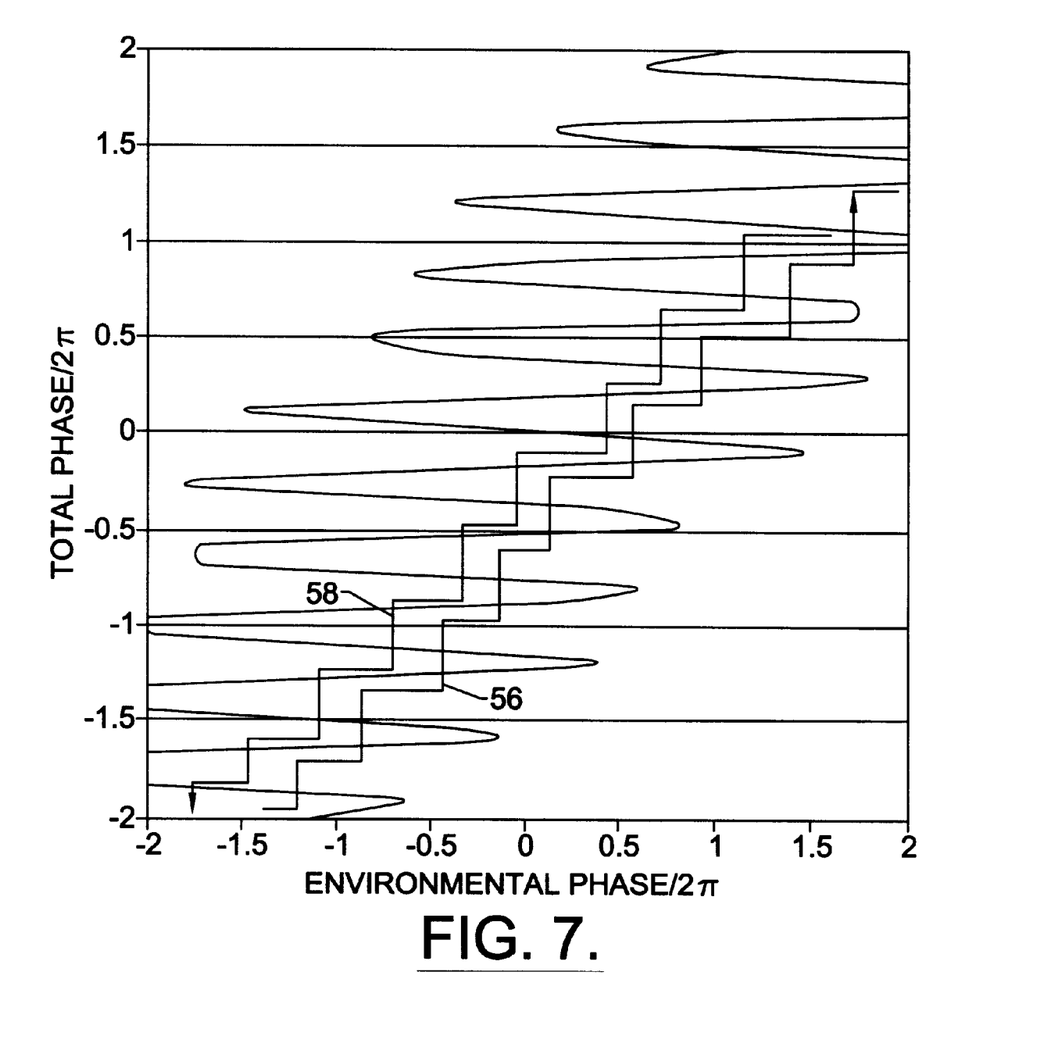
FIG. 7 is a graphic representation of the feedback signal illustrated in FIG. 2 along with the plot of limit lines used to determine the set point values according to one embodiment of the present invention.

As detailed above, the processor of this embodiment compares the lockin signal to predetermined set point values defining a range of acceptable lockin values. With reference to FIG. 7, the determination of the set point values used by the processor in this embodiment of the present invention is illustrated. FIG. 7 is a plot of the feedback signal with a gain value of g=10 as previously illustrated in FIG. 4. Specifically, FIG. 7 is a plot in terms of the total phase difference $\Delta\phi_{tot}$ between the reference and power signals and the phase difference between the reference and power signals due to environmental differences $\Delta\phi_{Env}$ and is defined by the equation:

$$\Delta\phi_{tot} = \Delta\phi_{Env} - g\sin(\Delta\phi_{tot})$$

As discussed with relation to FIG. 4, due to the sinusoidal nature of the lockin signal generated by the lockin amplifier, certain values of the lockin signal may cause uncontrollable modulation changes. For example, if the environmental phase difference is currently $\Delta\phi_{Env}/2\pi \approx 0.56$, then the total phase difference is $\Delta\phi_{tot}/2\pi \approx -0.8$. However, if in the next instant, the environmental phase changes to $\Delta\phi_{Env}/2\pi \approx 0.77$, the total phase difference will change to $\Delta\phi_{tot}/2\pi \approx -0.5$. This change in phase may cause uncontrollable modulation changes. To remedy these problems, the predetermined set points should be chosen such that lockin values that may cause uncontrolled modulation are altered prior to application to the optical phase modulator.

With reference to FIG. 7, to define the predetermined set point values, the equation for the feedback signal is plotted in terms of total phase difference of the reference and power signal $\Delta\phi_{tot}$ and the change in phase due to environmental effects $\Delta\phi_{Env}$. Limit lines 56 and 58 are then drawn such that the regions between the limit lines define lockin values that will not cause uncontrollable modulation changes. The limit lines are drawn for several $2\pi n$ factors. These limit lines define the set point values that are used by the processor to compare to the lockin signal, such that lockin signal values that are not within the range of the set points should be altered prior to application to the optical phase modulator. These determined set point values are typically stored in the processor and used to evaluate the lockin signal.

As discussed above, the present invention combines the lockin signal with a step waveform if the value of the lockin signal is not within the operation parameters of the optical phase modulator. Although the step waveform may be any type of waveform, in one embodiment, the step waveform is a step exponential waveform, where the step exponential waveform has an initial step that is $2\pi n$, where n is an integer that then exponentially returns to the original level. In this embodiment, the equation for the exponential function is defined as:

$$2\pi n e^{\frac{t}{\tau}u(t)-t_0}$$

where u(t)=unt step:
$t_0$=time of step:
$\upsilon$=time constant

The exponential step function also typically has a time constant (i.e., $\tau$) which is preferably equal to the time constant of the lockin amplifier.

As discussed previously, in some embodiments of the present invention, the detector assembly includes a lockin amplifier that generates a feedback signal that is the sine of the phase difference between the reference and power signals (i.e., $\sin(\Delta\phi_{tot})$). Because the lockin signal is represented in terms of the sine of the phase difference, the lockin value may be altered either positively or negatively by a value of $2\pi n$, where n is an integer, without affecting the phase with which the signal will be modulated.

For example, with reference to FIG. 6, in embodiments where the lockin signal exceeds the predetermined set point value, the processor combines the lockin signal with an exponential step function and generates a combined feedback signal that is altered by a scale factor of $2\pi n$. (See step 230). As the lockin signal is the sine of the difference in phase, the processor may alter the lockin signal by a factor of $2\pi n$ bringing the combined feedback signal into the operation range of the optical phase modulator without affecting the relative phase at which the optical phase modulator will modulate the output signal.

The processor may alter the lockin signal by the step waveform in many ways. For example, the processor may receive the lockin signal and combine the lockin signal with a step waveform that effectively subtracts a $2\pi n$ to form a combined feedback signal that has a reduction of $2\pi n$. In some embodiments, however, it may be preferable to combine the lockin signal with a step waveform that effectively adds $2\pi n$ to form a combined feedback signal that has an increase of $2\pi n$.

For example, if the maximum desired input value is $2\pi$, then the predetermined set point value may be set to $2\pi$ in this embodiment. As such, if the lockin signal has a value of $2.1\pi$, the processor will combine the lockin signal with a step waveform that effectively subtracts a $2\pi$ to form a combined feedback signal that has a reduction of $2\pi$.

In embodiments, in which the predetermined set point represents two set point values defining a range of lockin values that are acceptable for the operation of the optical phase modulator, the processor may either increase or decrease the lockin by $2\pi n$. In one embodiment, the processor determines whether to increase or decrease the lockin signal based on the drift trend of the lockin signal. For example, if the lockin signal has drifted upward over time, the processor my decrease the lockin signal by combining it with a step waveform having an initial step portion that is $2\pi n$ to create a combined feedback signal that is decreased by $2\pi n$. Similarly, if the feedback signal has drifted downward over time, the processor may combine the lockin signal with a step waveform having an initial step portion that is $2\pi n$ to create a combined feedback signal that is increased by $2\pi n$.

Figure 8A:
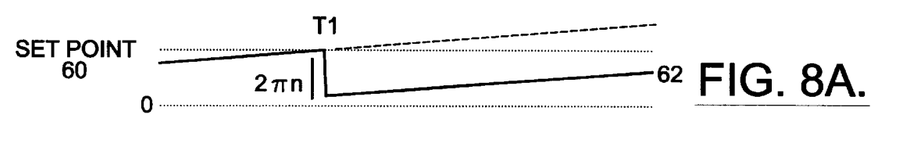
FIGS. 8A–8C are graphic representations of the feedback signal, scale factor function, and lockin amplifier signal according to one embodiment of the present invention.
Figure 8B:
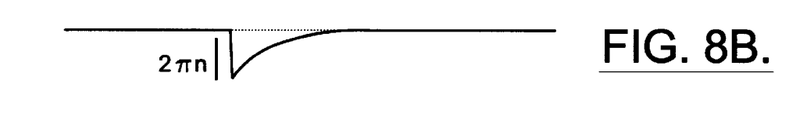
Figure 8C:
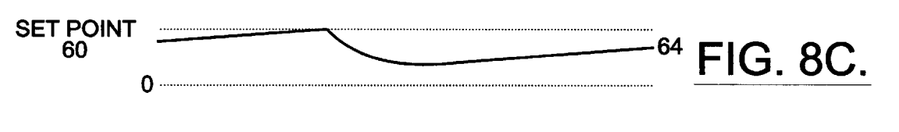

FIGS. 8A–8C are provided to further illustrate the alteration of the lockin. FIG. 8A is a graphic representation of the combined feedback signal output by the processor in terms of magnitude versus time. FIG. 8B is a graphic representation of a exponential step function that is combined with the feedback signal by the processor to reduce the lockin signal by $2\pi$. FIG. 8C is a graphic representation of the lockin signal output by the lockin amplifier before and after the processor has created the feedback signal.

With reference to FIG. 8A, at time T1, the feedback signal received by the processor has drifted above the predetermined set point value 60. At this point, the processor combines the feedback signal with the exponential step function of FIG. 8B at time T1. Due to the combination of the exponential step function of FIG. 8B with the feedback signal of FIG. 8A, the feedback signal is reduced to a level designated 62. When the combined feedback signal at the new level designated 62 is input into the optical phase modulator, the optical phase modulator alters the phase of the output signal. With reference to FIG. 8C, based on the altered output signal, the lockin amplifier generates a lockin signal 64 that is scaled down.

Figure 9A:
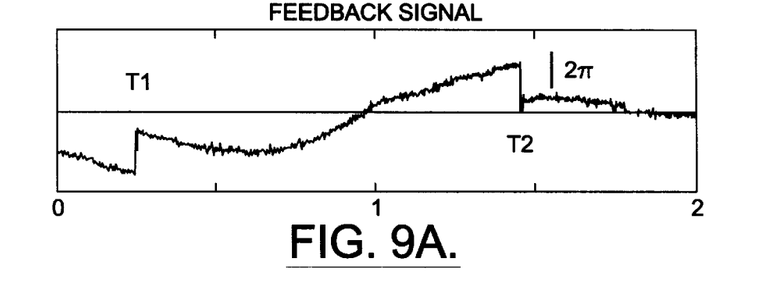
FIGS. 9A–9B are graphic representations of the feedback signal and output signal for the implementation of the apparatus of the present invention in a laser system.
Figure 9B:
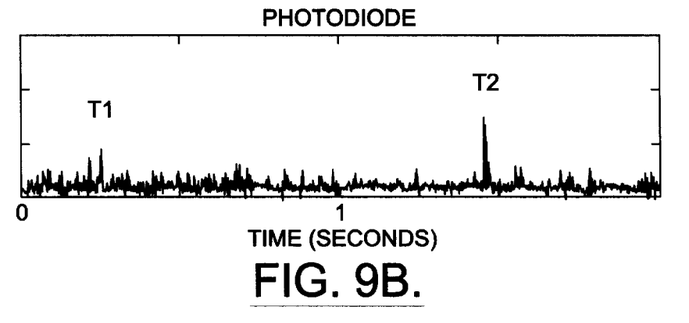

With reference to FIGS. 9A and 9B, actual data from the use of an optical interferometer incorporating the present invention is illustrated. Specifically, FIG. 9A represents graphically the feedback signal, and FIG. 9B represents the signal output by the lockin amplifier that is representative of the interference signal received by the detector. As can be seen from FIG. 9A, at time T1, the feedback signal has decreased below a predetermined set point value, and the processor increases the feedback signal by a scale factor of $2\pi$. Similarly, at time T2, the feedback signal has increased above a predetermined set point value, and the processor decreases the feedback signal by a scale factor of $2\pi$. With reference to FIG. 9B, the signal output by the lockin amplifier representing the interference signal is maintained at a minimum indicating that there is minimal phase difference between the reference and output signal. The only exceptions occur at times T1 and T2, when the reference and power signals are momentarily out of phase. In typical embodiments, the duration of the spikes at times T1 and T2 is inversely related to the bandwidth of the optical phase modulator.

The above embodiments illustrate the use of the present invention in relation to a typical optical interferometer. It must be understood that the present invention can be used with laser systems that use feedback loops to control the phase of an optical signal output by the laser system. As previously discussed, the assignee of the present application has developed several laser systems that control the output laser beam by use of feedback signals. At least some of these laser systems are disclosed in detail in U.S. Pat. No. 5,694,408 to Bott et al., the contents of which are incorporated herein by reference. It must be understood that the present invention may be used in these laser systems, as well as many other types of laser systems.

Figure 10:
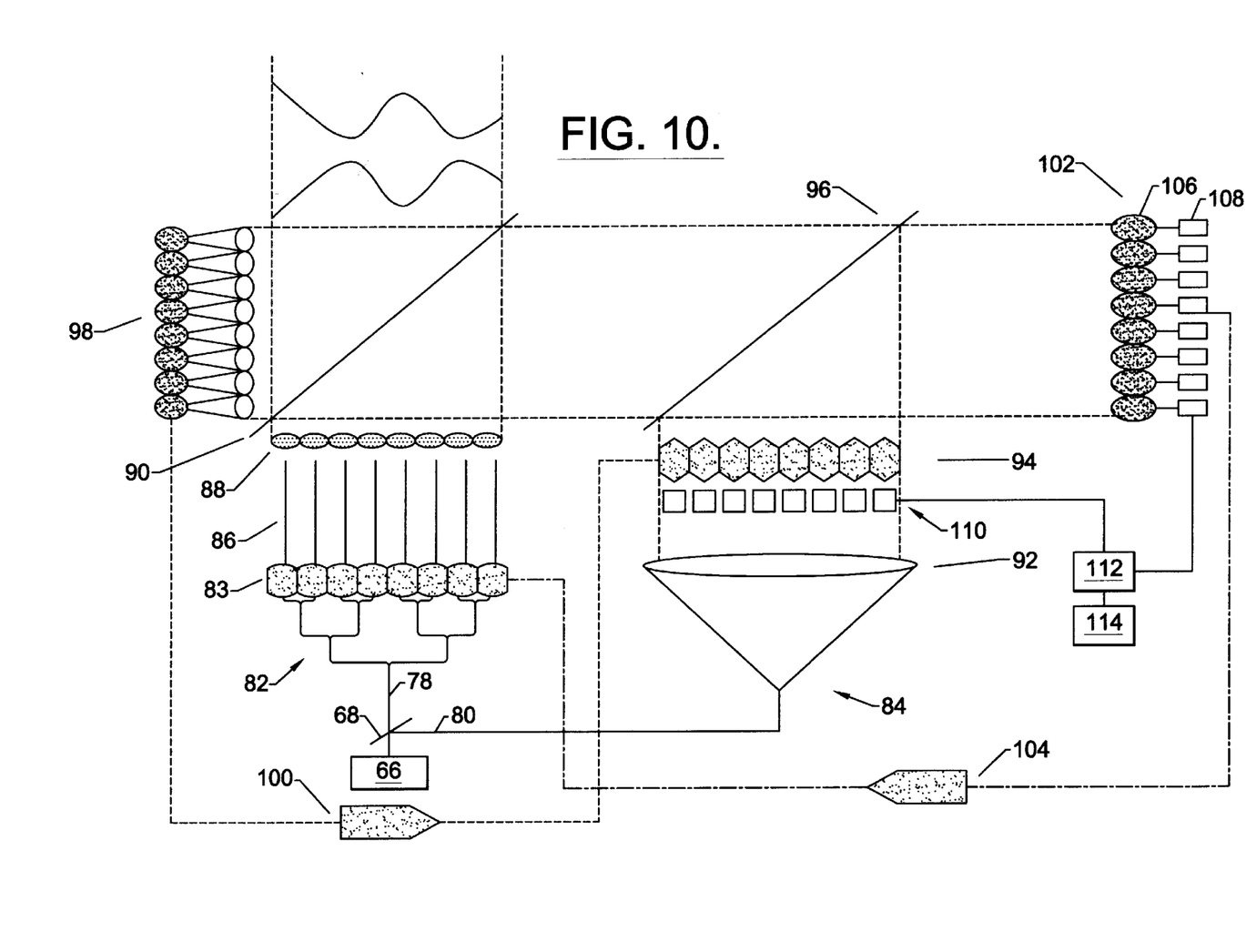
FIG. 10 is a block diagram of an apparatus for controlling the phase of an output signal in a high energy laser system that includes a near field modulation technique according to one embodiment of the present invention.

For illustrative purposes, provided below is an embodiment of the present invention in conjunction with a high energy laser system that includes a near field modulation technique, as more fully described in the Bott '408 patent. With reference to FIG. 10, the laser system of this embodiment includes a master oscillator 66 that provides an output optical signal. Connected to the master oscillator is a beam splitter 68 that divides a portion of the signal to form a power signal 78 and a reference signal 80. The power signal propagates through a power leg 82, and the reference signal propagates through a reference leg 84. The power leg 82 contains an array of phase modulators 83 for controlling the phase of individual portions of the power signal and an array of fiber amplifiers 86 that amplify the individual portions of the power signal. Additionally, the power leg 82 includes a plurality of fill lenses 88 and a beam splitter 90.

The reference leg 84 includes a collimating lens 92 for collimating the reference signal and an array of optical phase modulators 94 for controllably adjusting the respective phases of each of a plurality of reference signals. In optical communication with the array of optical phase modulators 94 of the reference leg and the beam splitter 90 of the output leg is a beam splitter 96. The beam splitter 96 combines the portion of the plurality of power signals divided by the beam splitter 90 and the plurality of reference signals from the array of optical phase modulators 94 to produce an interference signal.

The laser system also includes an array of wavefront sensors 98 that sense the wavefront of the output signal. Connected to the array of wavefront sensors is a wavefront processor 100 that receives a plurality of signals indicating the configuration of the wavefront of the output signal. The wavefront processor 100 is connected to the array of optical phase modulators 94 of the reference leg and controls the reference signal to impose a desired wavefront upon the optical signal. Importantly, the laser system of this embodiment initially transmits a test signal to a remote target. The reflection of the test signal is used to determine the manner in which the output optical signal is perturbed in the atmosphere prior to reaching the target. The reflection of this test signal is used by the wavefront processor 100 to determine the proper wavefront for the output signal. Specifically, the wavefront processor controls the reference signal via the array of optical phase modulators 94 to impose the desired wavefront upon on the reference signal. In this regard, the wavefront processor and the array of optical phase modulators can operate to impose a wavefront that is the phase conjugate of the reflected test signal so as to offset the anticipated atmospheric perturbations. The reference signals are combined with the portion of the power signal diverted by the beam splitter 68. The difference in phase between the reference and power signal represents the difference between desired wavefront and the actual wavefront of the output signal. As such, the interference of the reference and power signals can be used to drive the output signal to a desired wavefront.

To use the interference signal to control the wavefront of the output signal, the laser system of the Bott '408 patent uses a feedback loop that senses the interference signal and uses a processor to change the phase of the power signal via the optical phase modulators 83 of the power leg 78. Although this laser system of the Bott' 408 patent provides a reliable and accurate system for controlling the wavefront of an output signal, the laser system may experience some drawbacks due to the array of optical phase modulators 83. Specifically, as discussed in the previous embodiments, problems may occur where the feedback signal supplied to the array of optical phase modulators 83 exceeds the desired maximum value. Additionally, problems may occur where the feedback signal has a value that may cause uncontrollable modulation.

To remedy the potential problems with the feedback signal, the present invention provides an apparatus and method for compensating for phase shifts in an optical signal generated by an optical device. Specifically, the apparatus of this embodiment includes an array of detector assemblies 102 in optical communication with the beam splitter 96 for receiving the interference signal created by the combination of the reference and optical signals and generating a feedback signal. Connected to the output of the array of detector assemblies is a processor 104 for analyzing the lockin signal prior to input of the lockin signal into the array of optical phase modulators 94, such that the lockin signal is within the operation parameters of the array of optical phase modulators.

With reference to FIG. 6, the operation of the apparatus of the present invention to control the phase modulation of the laser system is shown. In this embodiment of the present invention, the plurality of detector assemblies receive respective portions of the interference signal produced by the combination of the reference and power signals. (See step 200). The plurality of detector assemblies generate respective lockin signals representing the difference in phase between the reference and power signals. (See step 210). The processor receives the plurality of lockin signals and compares the lockin signals to a predetermined set point value. (See step 220). If any of the plurality of lockin signals exceed the predetermined set point value, the processor combine the lockin signals with a step waveform and generates a combined feedback signal having a value within desired operation parameters of the optical phase modulator. (See step 230). If none of the lockin signals exceed the predetermined set point value, the lockin signals are not altered. The feedback signals or the lockin signals, if not altered, are next provided to the array of optical phase modulators, where the feedback or lockin signals are used to alter the phase of the output signal. (See step 240).

As discussed above, the present invention includes a plurality of detector assemblies for receiving the interference signal and generating a plurality of feedback signals representative of the interference signal. With reference to FIG. 10, in one embodiment of the present invention, the plurality of detector assemblies 102 each include a detector 106 and a lockin amplifier 108. In this embodiment of the present invention, the detector for each detector assembly receives the interference signal generated by the interference of the reference and power signals. The lockin amplifier for each detector assembly, in turn, generates a lockin signal that is proportional to the sine of the phase difference between the reference and power signals.

In this embodiment, the reference leg 84 of the present invention further includes an array of reference optical phase modulators 110 upstream of the beam splitter 96 for phase modulating the reference signal prior to interference of the reference and output signals. The apparatus of this embodiment also includes either one or a plurality of frequency generators 112 that are connected to both the array of reference phase modulators 110 and the lockin amplifiers 108. In this embodiment of the present invention, the array of reference optical phase modulators dither the reference signal at a reference frequency generated by the frequency generator.

As discussed, the present invention combines the lockin signal with a step waveform and generates a combined feedback signal having an appropriate value for application to the array of optical phase modulator. For instance, in one embodiment of the present invention, the predetermined set point value may represent a desired maximum value. The processor 104 of this embodiment analyzes the lockin signals and combines the lockin signals with step waveforms if they exceed the predetermined set point value. In another embodiment, the predetermined set point value may represent a range of lockin values, where lockin values outside this range may cause uncontrollable changes in modulation. In this embodiment of the present invention, the processor 104 analyzes the lockin signals, and if the lockin signals are not within the range of lockin signals defined by the predetermined set point values, the processor combines the lockin signal with a step waveform and generates a combined feedback signal having a value within desired operation parameters of the optical phase modulator.

The above disclosure details the use of the present invention in relation to two separate laser systems. It must be understood that the present invention may be used with laser systems that use feedback loops to control the phase of an optical signal output by the laser system. Additionally, the present invention has been illustrated with many different types of components. It must be understood that these present invention is not limited to the components shown, and the use of any components that perform similar functions to the components listed above are contemplated.

For instance, the master oscillator may be either a diode pumped fiber laser, a single mode diode laser, or diode pumped rods, slabs or mirrors. Additionally, the master oscillator preferably provides a primary laser signal having a predetermined wavelength and a predetermined power level. For example, the primary laser signal may have a predetermined wavelength of 1064 nanometers and a predetermined power level of 20 mW. However, the primary laser signal can have other wavelengths and power levels without departing from the spirit and scope of the present invention. In addition, the master oscillator typically provides a primary laser signal having a predetermined wavefront, such as $TM_{00}$, and a predetermined linewidth.

Similarly, the optical phase modulators may be implemented in several ways. For example the optical phase modulators may be liquid crystal modulators, electrooptic phase modulators, in-line fiber optic phase modulators which are responsive to stress, electric fields, magnetic fields or temperature, microelectromechanical optics such as semiconductor wafers having movable mirrors defined thereon or other electrically-actuated phase modulators known to those skilled in the art.

The beam splitters implemented in the present invention can be dichroic filters, partial transmission beam splitters, fiber optic combiners, or integrated optic combiners. Further, the detectors may be photo sensitive diodes or similar optical light detectors. The optical fiber amplifiers of the present invention are preferably optical fibers having a core doped with one or more rare earth elements, such as ytterbium, neodymium, praseodymium, erbium, holmium and thulium that amplify the optical signal when excited with a pump.

Additionally, the processor of the present invention may consist of any number of devices. The processor may be a data processing device, such as a microprocessor or microcontroller or a central processing unit that executes functions. The processor could be another logic device such as an integrated communication processor device, a custom VLSI (Very Large Scale Integration) device or an ASIC (Application Specific Integrated Circuit) device.

In addition to providing apparatus and methods, the present invention also provides computer program products for compensating for phase shifts in an optical signal generated by an optical device having an optical phase modulator for altering the phase of the optical signal and a detector assembly that generates a lockin signal representing an optical phase difference between the power signal and a reference signal. The computer program products have a computer readable storage medium having computer readable program code means embodied in the medium. With reference to FIGS. 5 and 10, the computer readable storage medium may be part of the memory device 114, and the processor, either 50 or 104, of the present invention may implement the computer readable program code means for controlling the phase of an optical signal output by a laser system as described in the various embodiments above.

The computer-readable program code means includes first computer-readable program code means for comparing the lockin signal to at least one predetermined set point value. Further, the computer-readable program code means also includes second computer-readable program code means for combining the lockin signal with a step waveform and generating a combined feedback signal, if the lockin signal exceeds the set point value, such that the combined feedback signal has a value within desired operation parameters of the optical phase modulator.

With reference to the first computer-readable program code means, as discussed previously with respect to the various apparatus and methods of the present invention, the predetermined set point of the first computer-readable program code means may represent different set point values. For instance, in one embodiment, the predetermined set point value may represent a desired maximum value above which saturation may occur. In this embodiment, the second computer-readable program code means will combine the lockin signal with a step waveform to thereby generate a combined feedback signal if it exceeds the predetermined set point value. In another embodiment, the predetermined set point value may represent a range of set point values, where lockin values outside the range may cause uncontrollable modulation changes. In this embodiment, the second computer-readable program code means will combine the lockin signal with a step wave form if the lockin signal is not within the range of lockin values defined by the predetermined set point values.

With reference to the second computer-readable program code means, as discussed previously with respect to the various apparatus and methods of the present invention, the second computer-readable program code means may combine the lockin signal with an exponential step waveform, if the lockin signal exceeds the predetermined set point value. Specifically, in one embodiment of the present invention, the second computer-readable program code means may combine the lockin signal with an exponential step waveform having a step portion of $2\pi n$, where n is an integer.

In this regard, FIGS. 5, 6, and 10 are a block diagram, flowchart and control flow illustration of methods, systems and program products according to the invention. It will be understood that each block or step of the block diagram, flowchart and control flow illustration, and combinations of blocks in the block diagram, flowchart and control flow illustration, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for compensating for phase shifts in an optical power signal, wherein said apparatus comprises:
   an optical phase modulator for altering the phase of the optical power signal;
   a detector assembly that receives an interference signal generated by optical interference of the optical power signal and a reference signal, wherein said detector assembly generates a lockin signal that is representative of an optical phase difference between the optical power signal and the reference signal; and
   a processor in electrical communication with both said detector assembly and said optical phase modulator, wherein said processor receives the lockin signal and compares the lockin signal to at least one predetermined set point value, wherein if the lockin signal exceeds the set point value, said processor alters the lockin signal by combining the lockin signal with a step waveform to thereby produce a combined feedback signal that has a value within desired operation parameters of said optical phase modulator.

2. An apparatus according to claim 1, wherein said processor compares the lockin signal to two predetermined set point values defining a range of lockin values that are within desired operation parameters of said optical phase modulator, and wherein if the value of the lockin signal is outside the range of lockin values defined by the set point values, said processor combines the lockin signal with a step waveform.

3. An apparatus according to claim 2, wherein if the lockin signal is outside the range of feedback values defined by the set point values, said processor combines the lockin signal with a step exponential waveform, wherein the step exponential waveform has an initial step that is $2\pi n$, where n is an integer.

4. An apparatus according to claim 3, wherein if the lockin signal is outside the range of lockin values defined by the set point values, said processor combines an exponential step function with the lockin signal to generate a combined feedback signal that is altered by a factor of $2\pi n$, where n is an integer.

5. An apparatus according to claim 1, wherein the set point value defines a maximum desired lockin signal, and wherein if the lockin signal exceeds the set point value, said processor combines the lockin signal with a step waveform.

6. An apparatus according to claim 5, wherein if the lockin signal exceeds the set point value, said processor combines the lockin signal with a step exponential waveform, wherein the step exponential waveform has an initial step that is $2\pi n$, where n is an integer.

7. An apparatus according to claim 5, wherein if the feedback signal exceeds the set point value, said processor combines an exponential step function with the lockin signal to generate a combined feedback signal that is altered by a factor of $2\pi n$, where n is an integer.

8. An apparatus according to claim 1, wherein said detector assembly comprises a detector that receives the interference signal and an lockin amplifier in electrical communication with said detector, wherein said lockin amplifier generates the lockin signal that is representative of the optical phase difference between the reference and optical power signals.

9. An apparatus according to claim 8 further comprising a reference phase modulator optically upstream from said detector and a frequency generator in electrical communication with said reference phase modulator, wherein said frequency generator generates a selected frequency signal, and wherein said reference phase modulator receives the selected frequency signal and modulates the reference signal at the selected frequency prior to the interference of the reference and optical power signals.

10. An apparatus according to claim 9, wherein said lock-in amplifier is in electrical communication with both said detector and said frequency generator and receives both the selected frequency signal and the interference signal, and wherein said lock-in amplifier generates a feedback signal representing a component of an optical phase difference between the optical signal and the reference signal at the frequency of the selected frequency signal.

11. An apparatus according to claim 1 further comprising at least one fiber amplifier optically upstream from said detector assembly, wherein said fiber amplifier amplifies at least one of the reference and optical power signals.

12. An apparatus according to claim 1 further comprising a gain amplifier in electrical communication with both said processor and said optical phase modulator, wherein said gain amplifier amplifies the combined feedback signal generated by said processor such that the combined feedback signal has sufficient gain for application to said optical phase modulator.

13. A method for compensating for phase shifts in an optical power signal generated by an optical device having an optical phase modulator for altering the phase of the optical power signal, wherein said method comprises the steps of:

receiving an interference signal generated by optical interference of an optical signal and a reference signal;

generating a lockin signal representative of an optical phase difference between the optical power signal and the reference signal;

comparing the lockin signal to at least one predetermined set point value; and combining the lockin signal with a step waveform to create a combined feedback signal if the lockin signal exceeds the set point value, such that the combined feedback signal has a value within desired operation parameters of said optical phase modulator.

14. A method according to claim 13, wherein said comparing step comprises comparing the lockin signal to two predetermined set point values defining a range of lockin values that are within desired operation parameters of the optical phase modulator, and wherein if the value of the lockin signal is outside the range of lockin values defined by the set point values, said combining step comprises combining the lockin signal with a step waveform.

15. A method according to claim 14, wherein if the value of the lockin signal is outside the range of lockin values defined by the set point values, said combining step comprises combining the lockin signal with a step exponential waveform, wherein the step exponential waveform has an initial step that is $2\pi n$, where n is an integer.

16. A method according to claim 13, wherein the set point value defines a maximum lockin signal, wherein if the lockin signal exceeds the set point value, said combining step comprises combining the lockin signal with a step waveform.

17. A method according to claim 16, wherein if the lockin signal exceeds the set point value, said combining step comprises combining the lockin signal with a step exponential waveform, wherein the step exponential waveform has an initial step that is $2\pi n$, where n is an integer.

18. A method according to claim 16, wherein if the lockin signal exceeds the set point value, said combining step comprises the step of combining an exponential step function with the lockin signal to generate a combined feedback signal that is altered by a factor of $2\pi n$, where n is an integer.

19. A method according to claim 13 further comprising prior to said detecting step the steps of generating a selected frequency signal and modulating the reference signal at the selected frequency prior to the interference of the reference and optical power signals.

20. A method according to claim 19, wherein said generating step comprises generating a lockin signal representative of a component of an optical phase difference between the optical power signal and the reference signal at the frequency of the selected frequency signal.

21. A method according to claim 13 further comprising the step of amplifying at least one of the reference and optical power signals prior to said detecting step.

22. A method according to claim 13 further comprising the step of gain amplifying the feedback signal generated in said generating step such that the feedback signal has sufficient gain for application to the optical phase modulator.

23. An apparatus for individually compensating for phase shifts in each of a plurality of optical power signals, wherein said apparatus comprises:

a plurality of optical phase modulators for altering the phase of an associated optical power signal;

a plurality of detector assemblies that each receive an interference signal generated by optical interference of an optical power signal and a reference signal associated with each detector assembly, wherein each of said detector assemblies generates a respective lockin signal representative of an optical phase difference between the optical power signal and the reference signal associated with said detector assembly; and a processor in electrical communication with both said plurality of detector assemblies and said plurality of optical phase modulators, wherein said processor receives a lockin signal generated by each of said detector assemblies and compares the respective lockin signal to at least one predetermined set point value for the respective optical phase modulator, wherein if the lockin signal exceeds the set point value said processor alters the lockin signal by combining the lockin signal with a step waveform to thereby produce a combined feedback signal that has a value within desired operation parameters of said optical phase modulator.

24. An apparatus according to claim 23, wherein said processor compares the respective lockin signal to two predetermined set point values defining a range of lockin values that are within desired operation parameters of said respective optical phase modulator, and wherein if the lockin signal is outside the range of lockin values defined by the set point values, said processor combines the lockin signal with a step waveform.

25. An apparatus according to claim 24, wherein if the lockin signal is outside the range of lockin values defined by the set point values, said processor combines the lockin signal with a step exponential waveform, wherein the step exponential waveform has an initial step that is $2\pi n$, where n is an integer.

26. An apparatus according to claim 24, wherein if the lockin signal is outside the range of lockin values defined by the set point values, said processor, said processor combines an exponential step function with the lockin signal to generate a combined feedback signal that is altered by a factor of $2\pi n$, where n is an integer.

27. An apparatus according to claim 23, wherein the set point value defines a maximum lockin signal value, and wherein if the lockin signal exceeds the set point value, said processor combines the lockin signal with a step waveform.

28. An apparatus according to claim 27, wherein if the respective lockin signal exceeds the set point value, said processor combines the lockin signal with a step exponential waveform, wherein the step exponential waveform has an initial step that is $2\pi n$, where n is an integer.

29. An apparatus according to claim 28, wherein if the respective lockin signal exceeds the set point value, said processor combines an exponential step function with the lockin signal to generate a combined feedback signal that is altered by a factor of $2\pi n$, where n is an integer.

30. An apparatus according to claim 23, wherein each of said plurality of detector assemblies comprises a detector that receives a respective interference signal and a lockin amplifier in electrical communication with said detector, wherein said lockin amplifier generates the lockin signal that is representative of the optical phase difference between the respective reference and optical power signals.

31. An apparatus according to claim 30 further comprising a plurality of reference phase modulators optically upstream from each of said plurality of detectors and a frequency generator in electrical communication with each of said reference phase modulators, wherein said frequency generator generates a selected frequency signal, and wherein each of said reference phase modulators receive the selected frequency signal and modulate a respective reference signal at the selected frequency prior to the interference of the reference and optical power signals.

32. An apparatus according to claim 31, wherein each of said lock-in amplifiers is in electrical communication with both a respective detector and said frequency generator and receives both the selected frequency signal from said frequency generator and an interference signal from said detector, and wherein each of said lock-in amplifiers generates a lockin signal representative of a component of an optical phase difference between the optical power signal and the reference signal at the frequency of the selected frequency signal.

33. An apparatus according to claim 23 further comprising a plurality of fiber amplifiers optically upstream from said plurality of detector assemblies, wherein said fiber amplifiers amplify at least one of an associated reference and optical power signals.

34. An apparatus according to claim 23 further comprising a plurality of gain amplifiers in electrical communication with both said processor and a respective optical phase modulator, wherein said gain amplifiers amplify an associated combined feedback signal generated by said processor such that the associated combined feedback signal has sufficient gain for application to said optical phase modulator.

35. An apparatus according to claim 23 further comprising a collimating lens upstream from said plurality of detector assemblies, wherein said collimating lens collimates the reference signal.

36. A computer program product for compensating for phase shifts in an optical power signal generated by an optical device, wherein the optical device includes an optical phase modulator for altering the phase of the optical signal and a detector assembly that generates a lockin signal that is representative of an optical phase difference between the optical power signal and a reference signal, wherein the computer program product comprises:

a computer readable storage medium having computer readable program code means embodied in said medium, said computer-readable program code means comprising:

first computer-readable program code means for comparing the lockin signal to at least one predetermined set point value; and second computer-readable program code means for combining the lockin signal with a step waveform to create a combined feedback signal if the lockin signal exceeds the set point value, such that the combined feedback signal has a value within desired operation parameters of said optical phase modulator.

37. A computer program product as defined in claim 36, wherein said first computer-readable program code means comprises computer readable program code means for comparing the lockin signal to two predetermined set point values defining a range of feedback values that are within desired operation parameters of the optical phase modulator, and wherein said second computer-readable program code means comprises computer readable program code means for combining the lockin signal with a step waveform, if the value of the lockin signal is outside the range of lockin values defined by the set point values.

38. A computer program product as defined in claim 37, wherein said second computer-readable program code means comprises computer readable program code means for combining the lockin signal with a step exponential waveform, wherein the step exponential waveform has an initial step that is $2\pi n$, where n is an integer, if the value of the lockin signal is outside the range of lockin values defined by the set point values.

39. A computer program product as defined in claim 37, wherein said second computer-readable program code means comprises computer readable program code means for combining an exponential step function with the lockin signal to create a combined feedback signal that is altered by a factor of 2πn, where n is an integer, if the value of the lockin signal is outside the range of lockin values defined by the set point values.

40. A computer program product as defined in claim 36, wherein the set point value defines a desired maximum lockin signal, and wherein said second computer-readable program code means comprises computer readable program code means for combining the lockin signal with a step waveform, if the lockin signal exceeds the set point value.

41. A computer program product as defined in claim 40, wherein said second computer-readable program code means comprises computer readable program code means for combining the lockin signal with a step exponential waveform, wherein the step exponential waveform has an initial step that is 2πn, where n is an integer, if the lockin signal exceeds the set point value.

42. A computer program product as defined in claim 40, wherein said second computer-readable program code means comprises computer readable program code means for combining an exponential step function with the lockin signal to create a combined feedback signal that is altered by a factor of 2πn, where n is an integer, if the lockin signal exceeds the set point value.

* * * * *